United States Patent
Huang et al.

(10) Patent No.: US 8,085,565 B2
(45) Date of Patent: Dec. 27, 2011

(54) VEHICLE INVERTER FOR POWERING CONSUMER ELECTRONIC DEVICES

(75) Inventors: Fengtai Huang, Northville, MI (US); Richard Hampo, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 422 days.

(21) Appl. No.: 12/420,231

(22) Filed: Apr. 8, 2009

(65) Prior Publication Data
US 2010/0259098 A1    Oct. 14, 2010

(51) Int. Cl.
*H02M 7/5387*    (2007.01)
(52) U.S. Cl. .................................................. 363/132
(58) Field of Classification Search ............... 363/37, 363/97, 98, 131–133
See application file for complete search history.

(56) References Cited

U.S. PATENT DOCUMENTS

| | | | |
|---|---|---|---|
| 4,099,225 A * | 7/1978 | Nygaard | 363/132 |
| 4,719,550 A * | 1/1988 | Powell et al. | 363/37 |
| 5,373,196 A | 12/1994 | Faley | |
| 5,563,802 A | 10/1996 | Plahn et al. | |
| 6,094,363 A * | 7/2000 | Cheng | 363/41 |
| 6,330,170 B1 * | 12/2001 | Wang et al. | 363/37 |
| 6,614,200 B2 | 9/2003 | Fowler et al. | |
| 7,305,291 B2 | 12/2007 | Koenig et al. | |
| 7,463,500 B2 * | 12/2008 | West | 363/132 |
| 7,733,670 B2 * | 6/2010 | Feng et al. | 363/98 |
| 7,787,270 B2 * | 8/2010 | NadimpalliRaju et al. | 363/37 |
| 2001/0048605 A1 * | 12/2001 | Kurokami et al. | 363/56.03 |
| 2004/0027001 A1 | 2/2004 | Reed, III | |
| 2005/0226021 A1 | 10/2005 | Do | |
| 2006/0171181 A1 * | 8/2006 | Clavel | 363/131 |
| 2007/0030717 A1 * | 2/2007 | Luger et al. | 363/132 |
| 2010/0206378 A1 * | 8/2010 | Erickson et al. | 363/40 |
| 2010/0246230 A1 * | 9/2010 | Porter et al. | 323/312 |

* cited by examiner

*Primary Examiner* — Jue Zhang
(74) *Attorney, Agent, or Firm* — Brooks Kushman P.C.

(57) ABSTRACT

An inverter for inverter DC power, such as but not limited to the type commonly employed in vehicle power systems, in to AC power, such as but not limited to the type commonly employed to power consumer electronic devices. The inverter may be configured to electrically isolate primary and secondary stages without requiring separate primary and secondary stage power supplies.

20 Claims, 4 Drawing Sheets

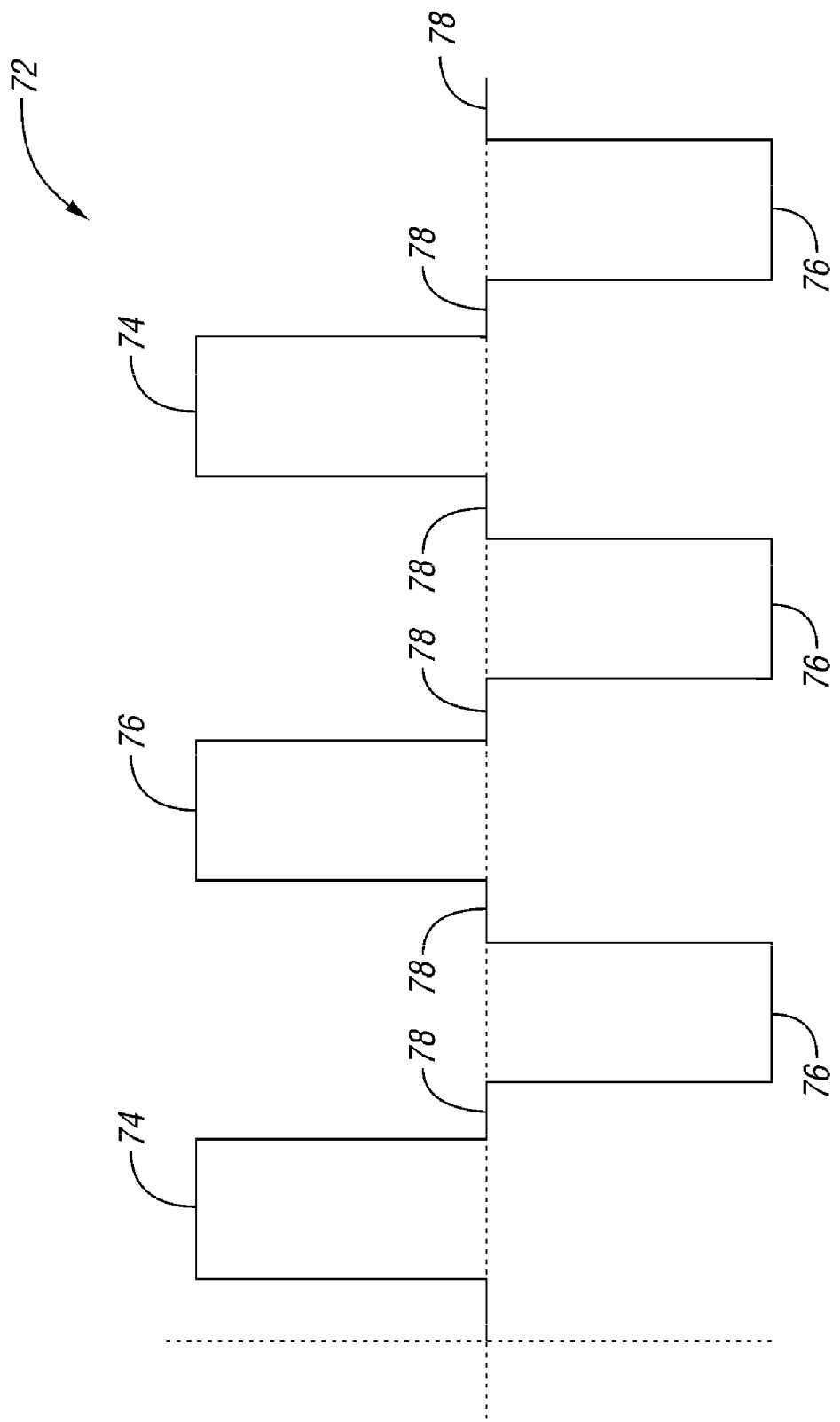

VEHICLE INVERTER FOR POWERING CONSUMER ELECTRONIC DEVICES

BACKGROUND OF THE INVENTION

1. Field of the Invention

The present invention relates to inverters of the type operable to invert low voltage DC power, such as but not limited to the type commonly employed in vehicle power systems, into AC power sufficient for powering consumer electronic devices.

2. Background Art

In recent years, a 120 Vac/230 Vac power supply for consumer electronics devices in vehicles has become a basic feature in automotive industry. In some applications, the power source of the 120 Vac/230 Vac supply is from a 12 Vdc vehicle battery. Usually, the 12 Vdc is first stepped-up to a higher level dc voltage, such as 170 Vdc/340 Vdc, and then it is inverted to a modified sine wave AC voltage. The power rating of this 120 Vac/230 Vac power supply may be up to one kilowatts. A typical circuit configuration for an inverter 100 is shown in FIG. 1.

In FIG. 1, a step-up converter 102 is shown as a push-pull converter, having one of a full bridge or central tapped rectifier 104, and an output inverter 106 is shown as an H-bridge. Each of the converter 102 and the inverter 106 includes switching devices 108, 110 that must be selectively activated and deactivated in a manner suitable to stepping-up and inverting the DC supply 1 12. Separate push-pull and H-bridge controllers 114, 116 may be used to output time varying signals to selectively activate and deactivate switching components 108, 110 of the converter 102 and inverter 106. These time varying signal may be fed to driver circuits 120, 122 that in turn coordinate activation and deactivation of a selected one or more of the switching devices 108, 110.

Importantly, two separate auxiliary power supplies 126, 128 are used for each of the controllers 114, 116. One of the power supplies 126 is a voltage regulator, such as a linear regulator, that regulates the battery voltage to a voltage suitable for powering the controller 114 and drivers 120. The other one of the power supplies 128 is an isolated, switch mode power supply (SMPS) that electrically isolates the second stage of the inverter from the primary stage. It may include a power transformer (not shown) to facilitate electrically isolating power supplied to the gate driver 122 and controller 116 relative to the power provided to the primary stage.

The use of the SMPS 128 to electrically isolate the primary stage from the secondary stage is advantageous in preventing the higher voltage secondary stage from interfering with operations of the primary stage. Isolated SMPS, however, are large in size and relatively expensive in design due to use of components having greater power ratings, like the power transformer.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 4 illustrates an output AC signal as a modified sine wave in accordance with one non-limiting aspect of the present invention.

DETAILED DESCRIPTION OF THE PREFERRED EMBODIMENT(S)

Figure 2:
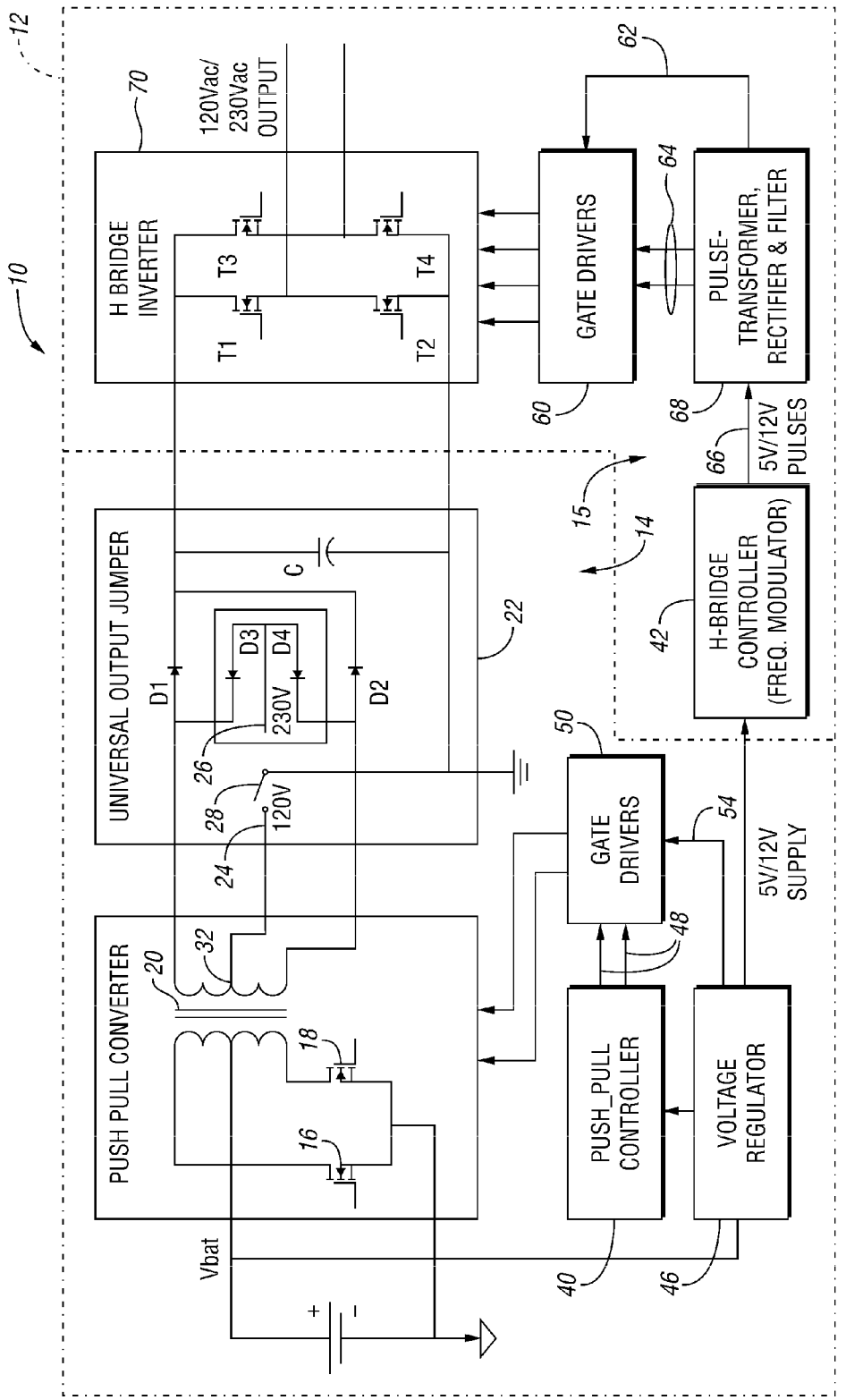
FIG. 2 illustrates an inverter configured to support inverting DC power to AC power in accordance with one non-limiting aspect of the present invention.

FIG. 2 illustrates an inverter 10 configured to support inverting DC power to AC power in accordance with one non-limiting aspect of the present invention. The inverter 10 may be included within a housing 12 mounted within a vehicle (not shown) to facilitate inverting DC vehicle power, such as but not limited to that provided by a vehicle battery, into AC power suitable to powering consumer electronic devices, such as but not limited to those commonly plugged into a wall outlet within a home or those powered by 120/230 Vac at 50/60 Hz. The present invention contemplates a need to support the operation of relatively low power consumer devices within the vehicle using the inverter 10, such as but not limited to devices that require up to 1 kW.

The inverter 10 may include a primary stage 14 and a secondary stage 15. The primary stage 14 may include components and features suitable to facilitate stepping-up of DC power supplied from the vehicle battery. The secondary stage 15 may include components and features suitable to inverting the DC power into AC power. For exemplary purposes, the primary stage 14 may be include a number of switching components 16, 18 and a power transformer 20 arranged in a push-pull configuring to facilitate stepping-up the DC power supplied by the battery. The present invention, however, is not intended to be limited to the illustrated arrangement and fully contemplates any other configuration, such as but not limited to half bridge and full bridge converters.

The stepped-up, AC output from the power transformer 20 may be delivered to a rectifier 22 prior to output to the secondary stage. The rectifier 22 may be a switchable rectifier in that it can be switched between a transformer center tapped position 24 and a non-center tap position 26 with the actuation of a switch 28. In the non-center tapped position 26, a number of diodes D1, D2, D3, and D4 arranged in a full-wave, bridge configuration, may be connected to the two end terminals at the output of the transformer 20 such that the rectifier 22 outputs approximately at 230 Vdc. In the center tapped position 24, only diodes D1 and D2 are active, Diode 3 and Diode 4 are in the reverse blocking state (floating state), effectively causing the rectifier 22 to be arranged in a center tapped configuration. The center tapped configuration halves the full wave output of the rectifier 22 such that approximately 120 Vdc is supplied to the secondary stage 15.

A switch controller (not shown) may be used to actuate the switch 28 between the center tapped and non-center tapped positions 24, 26. The ability to control the voltage output of the primary stage 14 can be beneficial in supporting operational demands of various electronic devices. It can also be helpful from a manufacturing viewpoint in that it allows vehicle manufactures to purchase the inverter 10 of the present invention for use in vehicles sold in the United States and Europe, or other locals having similar power demands, without having to build or support the manufacturing of different inverter systems.

The inverter 10 of the present invention can be used in locations having varying power demands by simply adjusting the position of the switch 28, and as described below in more detail, implementing software controlled frequency adjustments to the AC output. Importantly, these adjustments can be made without having to replace hardware. While the foregoing example is described with respect to switching between 120 Vac at 50 Hz and 230 Vac at 60 Hz, the present invention fully contemplates selecting component values to support any AC output voltage and frequency. The inverter 10 of the present invention may be a relatively flexible inverter having capabilities to switch its AC output without significant demands on the manufacturer.

The ability to switch AC outputs can be facilitated with a switch controller (not shown) controlling the positioning of the switch 128. The switch controller may be a vehicle system controller or it may be included within one of the other controllers of the inverter 10. The inverter 10 may include a primary stage controller 40 and a secondary stage controller 42 that operate in concert with the switch controller to facilitate the inversion contemplated by the present invention. In more detail, the primary and secondary stage controllers 40, 42 may be configured to control switching operations of the primary and secondary stages 14, 15 in order to facilitate stepping-up the supplied DC voltage and its subsequent inversions into the desired AC output.

A voltage regulator 46 may be used to power each of the primary and secondary controllers 40, 42. The voltage regulator 46 may be a linear regulator or other regulator having a configuration suitable to supply a substantially constant voltage to the controllers 40, 42. The regulator 46 shown in FIG. 2 may be configured to output 5 or 12 V to the controllers 40, 42, depending on the operating demands of the controllers, including the ability to provide each controller 40, 42 with the same or different voltages from the same or different output. The regulation performed by the regulator 46 is common to both of the controllers 40, 42 such that the controllers are electrically tied together.

Figure 1:
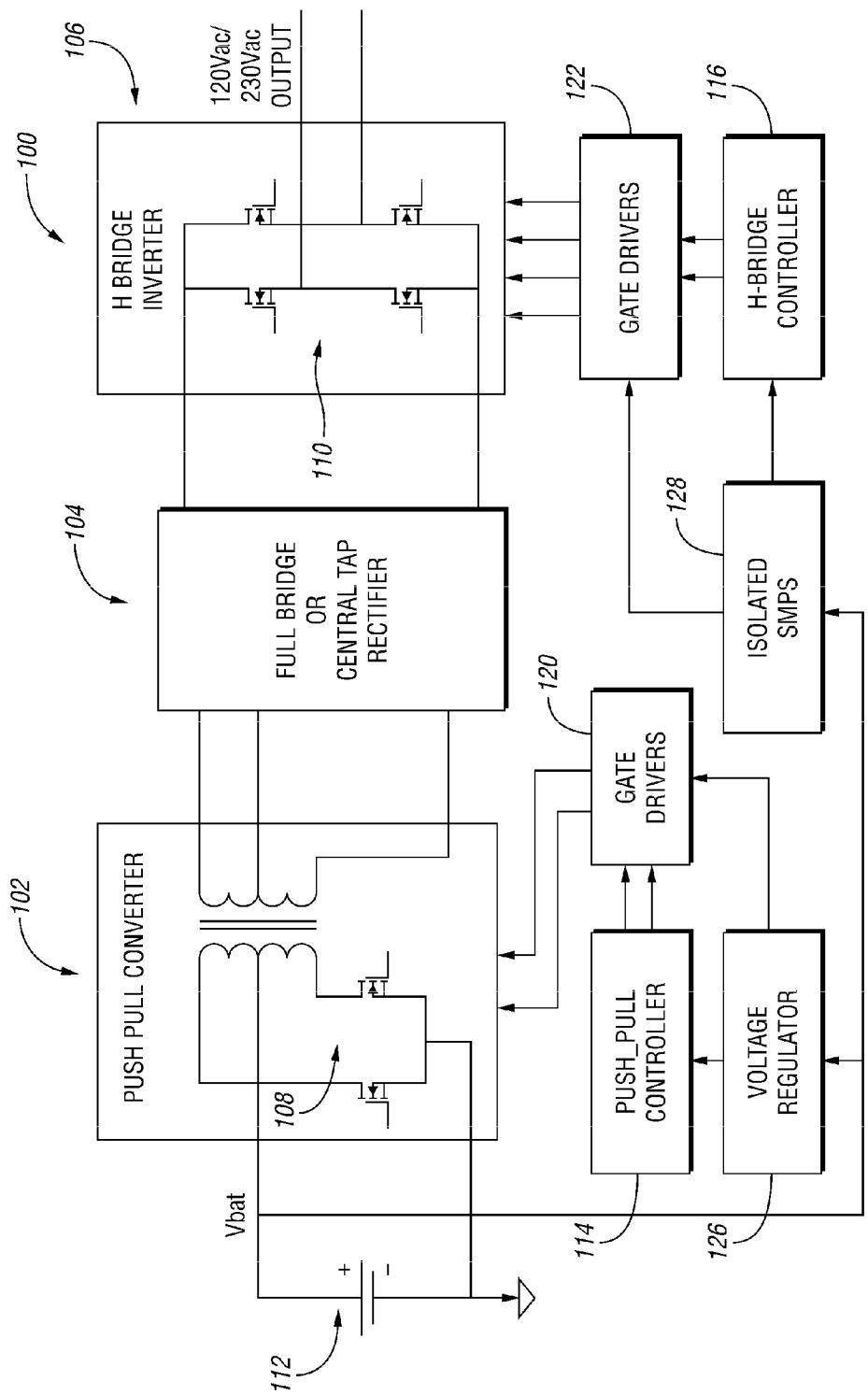
FIG. 1 illustrates an inverter having isolate primary and secondary stage power supplies.

Unlike the arrangement shown in FIG. 1 where the controllers 114, 116 are electrically isolated by the use of a switch mode power supply 128 which is isolated from 126, the controllers 40, 42 of the present invention are not electrically isolated While the primary and secondary stage controllers 40, 42 are electrically coupled, the controllers 40, 42 need not be the same type of controller. The primary controller 40, for example, may be configured to control the switching devices 16, 18 according to the operational requirements of the primary stage 14 while the secondary controller 42 may be configured in a different manner to support the operational requirements of the secondary stage 15. The primary controller 14 may include a signal generator (not shown) that outputs time varying signals 48 to a gate driver 50. This control signal 48 may be of a nominal voltage and current that is otherwise insufficient for powering the gate drivers 50 or the switches 16, 18. The gate drivers 50 may use the control signal 48 to coordinate activation and deactivation of the switching devices 16, 18. The voltage regulator 46 may instead be configured to supply the power required by the gate drivers and the switching devices, which for exemplary purposes is shown to be 5 or 12 V signal 54.

In this manner, the gate driver 50 of the primary stage 14 requires power and control signals 48, 54 in order to facilitate proper control of the primary stage switching devices 16, 18. Gate drivers 60 of the secondary stage 15 require similar power and control signals 62, 64 to control switching devices T1, T2, T3, T4 of the secondary stage 15. In order to electrically isolate the power and control signals 62, 64 of the secondary stage 15 from those of the primary stage 14, the present invention relies on the secondary controller 42 to output a frequency modulated signal 66 to a signal converter 68. The signal converter 68 then passively converts the frequency modulated signal 66 to generate the power and control signals 62, 64 required by the gate drivers 60. The signal converter 68 is configured in a manner that electrically isolates the power and control signal 62, 64 used with the secondary gate driver 60 from the similar control signals 48, 54 used with the primary gate drivers 50.

Figure 3:
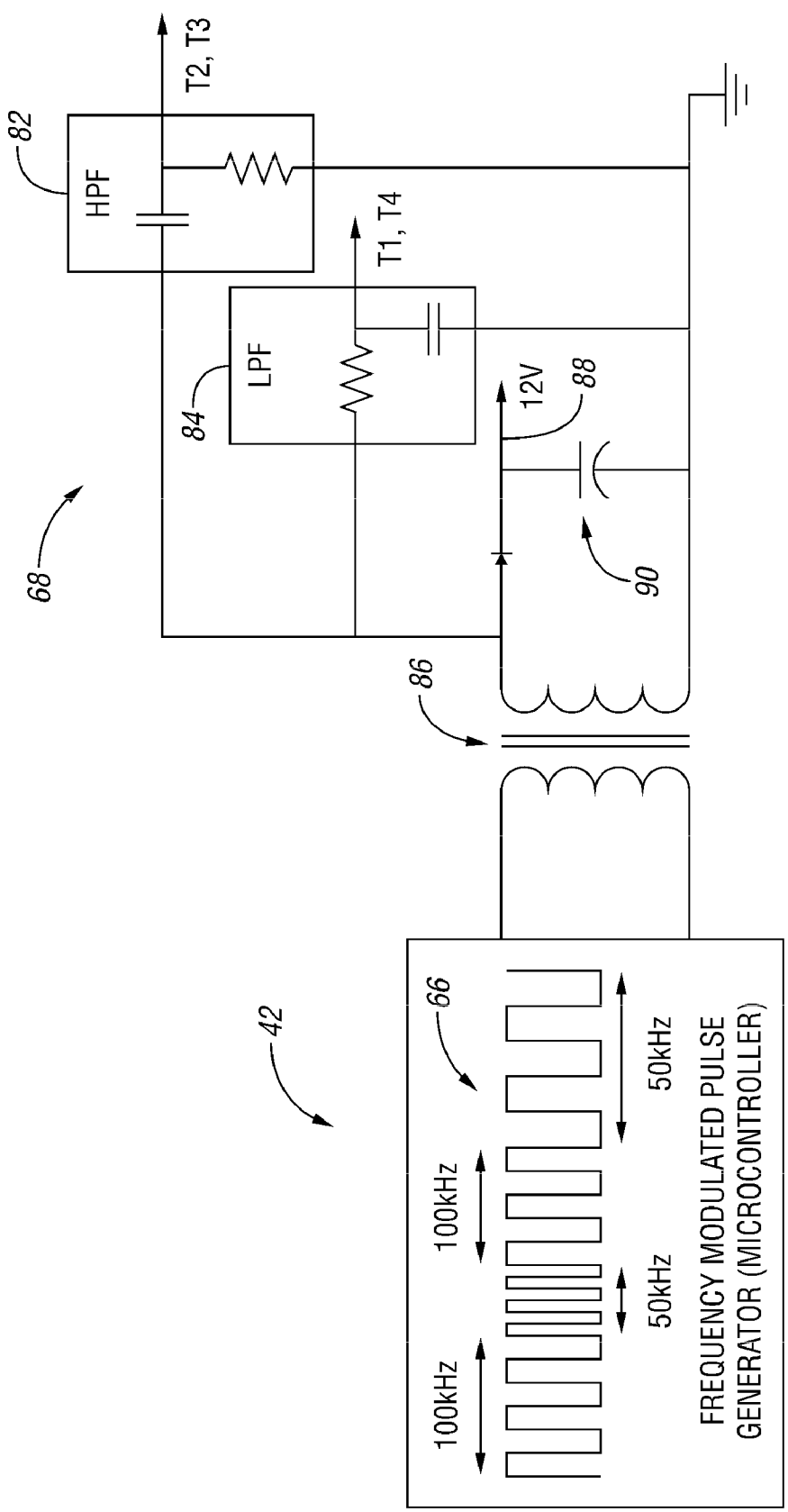
FIG. 3 illustrates a secondary controller and signal converter configured in accordance with one non-limiting aspect of the present invention.

FIG. 3 illustrates the secondary controller 42 and signal converter 68 configured in accordance with one non-limiting aspect of the present invention to facilitate generating the power and control signals 62, 64 required by the secondary gate drivers 60. Because it is desired to power consumer devices with single phase, AC power, the secondary gate driver 60 must be provided with time varying control signals 64 that it can rely on to selectively control the switching devices T1, T2, T3, T4 of the secondary stage 15 to shape a waveform of the output. For exemplary purposes, the inverter 70 of the secondary stage 15 is shown to have the switching mosFETs T1, T2, T3, and T4 arranged in an H-bridge configuration. This is done for exemplary purposes only as the present invention fully contemplates the use of other inverter configurations.

The secondary controller 42 may be configured to operate in cooperation with the signal converter 68 to provide the time varying signals 64 required by the gate drivers 60 to properly controller the switches T1, T2, T3, and T4. To this end, the secondary controller 42 may be configured as a frequency modulator that outputs a selected frequency to shape the AC output. For exemplary purposes, the frequency modulator outputs at one of three frequencies of 50 kHz, 100 kHz, and 150 kHz depending on the desired shape of the output AC signal. FIG. 4 illustrates the output AC signal 72 as a modified sine wave in accordance with one non-limiting aspect of the present invention. The modified sine wave is shown for exemplary purposes and without intending to limit the scope and contemplation of the present invention—other waves, include improved modified since waves, could be output without deviating from the scope and contemplation of the present invention.

As shown, the sine wave 72 is generally constructed as succeeding positive and negative cycles 74, 76 that begin and end with a zero crossing 78. The present invention contemplates controller the frequency of the frequency modulated signal 66 to correspond with these cycles. In particular, the frequency may be switched between the noted frequencies depending on the current cycle 74, 76, 78 of the sine wave 72. For example, during a positive cycle 74 of the sine wave 72, switches T1 and T4 may be switched on while switches T2 and T3 are off. Thereafter, the switches T1, T2, T3, and T4 maybe turned off to facilitate the zero crossing 78 leading into the negative cycle 76 that begins with switching on the switches T2 and T3 while the switches T1 and T4 remain off.

The present invention contemplates controlling the switching devices T1, T2, T3, and T4 in a passive manner by simply varying the frequency of the frequency modulated signal 66 output from the controller 42 to the signal converter 68, such as by assigning each portion of the cycle 74, 76, 78 to one of the 50 kHz, 100 kHz, and 150 kHz modulate signals. The signal converter 68 may include a low pass filter 82 and a high pass filter 84 to filter the frequency modulated signal such that related control signals 64 are only output to the switches T1, T2, T3, and T4 if the frequency is passed by the respective filter. In this manner, the frequency modulated signal 66 can be varied to insure signals are only passed by the filters 82, 84 associated with the switches T1, T2, T3, T4 to be activated and deactivated.

In the arrangement shown in FIG. 3, the switches T1, T2, T3, and T4 are deactivated whenever the high and low pass filter 82, 84 prevent output of the filtered signals 64. The signal converter 68 further includes a signal transformer 86 to electrically isolate the signal converter 68 from the secondary controller 42. This provides the desired electrical isolation of the first and second stages 14, 15 in a cost effective manner since the signal transformer 86 is less expensive than power transformers used in SMPS. Moreover, the relative low power transmissions performed by the signal transformer 86 can help further limit the size and cost of the signal converter 68.

The signal converter 68 also includes a power output 88 in addition to the signal outputs used to respectively activate the switches T1 and T4 and the switches T2 and T3. The power output 88 may be generated with a rectifier portion 40 that is configured to smooth the AC signal at the output side of the signal transformer 86 into a 12 V DC power supply. The power supply 88 can provide the power required by the gate drivers 60 to facilitate the desired switching operations. In this manner, the signal converter 68 includes only passive components to convert the frequency modulated signal 66 output from the controller 42 into the power supply and control signals 62, 64 required by the gate driver 60 to control the activation and deactivation of the switches T1, T2, T3, and T4.

As noted above, the inverter 10 may include the switch 28 to facilitate switching between 120 V and 230 V AC outputs. The frequency of this output can be controlled by the secondary controller 42 selectively adjusting the time periods during which the switches T1, T2, T3, and T4 are active and inactive. In other words, to switch from a 50 Hz output to a 60 Hz output, the secondary controller 42 only needs to make slight modifications to the duration of the positive and negative portions of the AC duty cycle. This can be done through software control of the frequency modulated signal 66 and without any hardware modifications. This allows the present invention to easily supply AC power to consumer electronics in the United States and Europe. Optionally, the secondary controller 42 may be configured to automatically set the frequency modulated signal in response to whether the switch 28 is in the center tapped or non-center tapped position 24, 26.

As supported above, with the ever increasing demand for cost reduction, auto makers may be forced to unify their designs for different systems, such as 120 Vac and 230 Vac, and to minimize their designs to reduce engineering, manufacturing, and components cost. At least one non-limiting aspect of the present invention describes a unified design that is configurable for both 120 Vac and 230 Vac systems. This invention also describes a simplified inverter control method that does not require an isolated switching mode power supply for its inverter controller. The configuration contemplated by the present invention can be realized with any practical means, such as a wire jumper or a mechanical switch. By flipping the switch to the left in the universal output jumper box shown in FIG. 2, the output is configured at 120 Vac. Likewise, by flipping the switch to the right, the output is configured at 230 Vac. When output is configured as 120 Vac, the two diodes D3 and D4 are not populated. The DC link capacitor, C, can be sized at 250V. The inverter switches, T1, T4 can be rated 250V. If the output is configured at 230 Vac, the two diodes, D3 and D4, will be populated. The dc link capacitor and the inverter switches may be rated at 350V.

The reduction of isolated switching mode power supply is based on the amount of power required by the inverter gate drive circuit. Since the inverter is switched at 50 Hz/60 Hz. The power required is very minimal. A standard gate drive pulse transformer can be used. This pulse transformer can perform two functions—providing power for gate drive circuit and passing gate drive switching signals in the form of frequency modulated signals. As noted, a frequency modulated (FM) pulse generator can be used to generate the switching signals to control the gates of the H bridge inverter switching devices. The FM signal may be designed in such a way that when there is no switching signal required the pulse generator generates 100 kHz pulses. When switching signals for T1 and T4 are required the generator generates 50 kHz pulses. 150 kHz pulses can be generated for switch T2 and T3. At the output of the pulse transformer, the rectified 12 Vdc is available with or without switching signals present. The output of low pass filter (LPF) provides signals for switch T1 and T4. The output of high pass filter (HPF) provides signals for switch T2 and T3. The phase delay due to the filters can be compensated by adding or subtracting the phase delay difference between the two filters to the commanded signals in the frequency modulated pulse generator within the H bridge controller. Once the gate drive supply and signals are available the implementation of H bridge gate drives can be realized with any existing topologies.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An inverter for use in a vehicle having a DC power supply, the inverter comprising:
   a primary stage having switching devices operable in response to primary stage control signals to boost a first DC output of the DC power supply to a second DC output;
   a secondary stage having switching devices operable in response to secondary stage control signals to invert the second DC output into an AC output;
   a primary stage controller configured to output the primary stage control signals used to control the switching devices of the primary stage to boost the first DC output to the second DC output;
   a secondary stage controller configured to output a frequency modulated signals representative of the secondary stage control signals needed to control the switching devices of the secondary stage to invert the second DC output into the AC output;
   a signal converter configured to convert the frequency modulated signals into the secondary stage controls signals used to control the switching devices of the secondary stage to invert the second DC output into the AC output; and a regulator configured to power both of the primary and secondary stages using the first DC output of the DC power supply.

2. The inverter of claim 1 wherein the regulator is configured to regulate the first DC output to a first stage DC output for powering the primary controller and a second stage DC output for powering the secondary stage controller.

3. The inverter of claim 1 wherein the signal converter includes a transformer, a rectifier and a filter.

4. The inverter of claim 3 wherein the filter includes a high pass filter (HPF) and a low pass filter (LPF), each of the LPF and the HPF respectively being configured to selective activate one or more of the switching devices responsive to the frequency modulated signals having a first or second frequency.

5. The inverter of claim 4 wherein the secondary stage controller is further configured to selectively control output of the first and second frequency depending on desired characteristics of the AC output.

6. The inverter of claim 5 wherein the secondary stage controller is further configured to output a third frequency to selectively deactivate the switching devices of the secondary stage in order to prevent output of the AC output.

7. The inverter of claim 4 wherein the first frequency is approximately 50 kHz, the second frequency is approximately 150 kHz, and the third frequency is approximately 100 kHz.

8. The inverter of claim 3 wherein the signal converter is electrically connected between the secondary stage controller and the switching devices of the secondary stage, the transformer thereby electrically isolating the secondary stage switching devices from the primary and secondary stage controllers.

9. The inverter of claim 1 wherein the primary stage includes a push-pull-converter, a rectifier, and switch, the switch being operable between a center tapped position in which the rectifier acts as a center tapped rectifier and a non-center tapped position in which the rectifier acts as a bridge rectifier.

10. The inverter of claim 1 wherein the primary stage includes a rectifier having four diodes and a switch, wherein the diodes are arranged in a bridge configuration and the switch is operable between a center tapped position and a non-center tapped position, the center tapped positioning corresponding with the anode of two of the diodes being in a floating state and the non-center tapped position corresponding with the anode of the two of the diodes being connected to reference ground of the H bridge.

11. The inverter of claim 1 wherein the primary stage includes a rectifier having a plurality of diodes and a switch, wherein the plurality of diodes are arranged in a bridge configuration and the switch is operable between a center tapped position and a non-center tapped position, the center tapped positioning corresponding with the anode of at least a first portion of the diodes being in a floating state and the non-center tapped position corresponding with the anode of at least the first portion of the diodes being connected to an end of the transformer.

12. An inverter for use in a vehicle having a DC power supply, the inverter comprising:

a primary stage having switching devices operable in response to primary stage control signals to boost a first DC output of the DC power supply to a second DC output;

a secondary stage having switching devices operable in response to secondary stage control signals to invert the second DC output into an AC output;

a primary stage controller configured to output the primary stage control signals;

a secondary stage controller configured to output a frequency modulated signals representative of the secondary stage control signals at a frequency of more than 200 Hz; and a signal converter configured to convert the frequency modulated signals into the secondary stage controls signals, the signal converter being further configured to output the secondary stage controls signals at a frequency of less than 200 Hz.

13. The inverter of claim 12 further comprising a regulator configured to regulate the first DC output to a control output for directly powering both of the primary and secondary stage controllers.

14. The inverter of claim 13 wherein the signal converter is connected between the secondary stage controller and the switching devices of the secondary stage and includes a transformer to electrically isolate the switching devices of the secondary stage from the secondary stage controller.

15. The inverter of claim 12 wherein the primary stage includes a push-pull-converter, a rectifier, and switch, the switch being operable between a center tapped position in which the rectifier acts as a center tapped rectifier and a non-center tapped position in which the rectifier acts as a bridge rectifier.

16. An inverter for use in a vehicle having a DC power supply, the inverter comprising:

a primary stage having switching devices selectably operable between active and inactive states to boost a first DC output of the DC power supply to a second DC output;

a secondary stage having switching devices selectably operable between active and inactive states to invert the second DC output into an AC output;

a primary stage controller configured to output primary stage control signals used to selectably operate the switching devices between the active and inactive states required to boost the first DC output of the DC power supply to the second DC output;

a secondary stage controller configured to output a frequency modulated signal representative of secondary stage control signals needed to selectably operate the switching devices between the active and inactive states required to invert the second DC output into the AC output;

wherein the secondary stage controller switches an output frequency of the frequency modulated signal between a first frequency, a second frequency, and a third frequency to shape the AC output, the first frequency being output during a positive portion of the AC output, the second frequency being output during a negative portion of the AC output, and the third frequency being output during a zero crossings between the positive and negative cycles; and a signal converter configured to receive the frequency modulated signals and to passively convert the frequency modulated signal into the secondary stage control signals used to selectively activate and deactivate each one of the switching devices of the secondary stage as a function of whether the frequency modulated signal is at the first, second, and third frequency.

17. The inverter of claim 16 further comprising a regulator configured to regulate the first DC output to a control output suitable for powering both of the primary and secondary stage controllers.

18. The inverter of claim 17 wherein the signal converter is connected between the secondary stage controller and the switching devices of the secondary stage and includes a transformer to electrically isolate the switching devices of the secondary stage from the secondary stage controller.

19. The inverter of claim 16 wherein the primary stage includes a push-pull-converter, a rectifier, and switch, the switch being operable between a center tapped position in which the rectifier acts as a center tapped rectifier and a non-center tapped position in which the rectifier acts as a bridge rectifier.

20. The inverter of claim 16 wherein the frequency modulated signal is greater than 200 Hz and the secondary stage control signals are less than 200 Hz.

* * * * *